(12) United States Patent
Mitchell et al.

(10) Patent No.: US 7,267,537 B2
(45) Date of Patent: Sep. 11, 2007

(54) LOCK APPARATUS FOR THE BASE PORTION OF A BLOW MOLD

(75) Inventors: Wesley R. Mitchell, Pleasant Hill, MO (US); William T. Riley, Kansas City, MO (US)

(73) Assignee: R & D Tool & Engineering Co., Lee's Summit, MO (US)

( * ) Notice: Subject to any disclaimer, the term of this patent is extended or adjusted under 35 U.S.C. 154(b) by 358 days.

(21) Appl. No.: 10/962,047

(22) Filed: Oct. 8, 2004

(65) Prior Publication Data
US 2006/0078643 A1    Apr. 13, 2006

(51) Int. Cl.
*B29C 49/48* (2006.01)
*B29C 49/56* (2006.01)

(52) U.S. Cl. ................... 425/182; 425/541
(58) Field of Classification Search ........... 425/182, 425/195, 522, 525, 541
See application file for complete search history.

(56) References Cited

U.S. PATENT DOCUMENTS

| | | | |
|---|---|---|---|
| 3,643,981 A * | 2/1972 | Grandel et al. | ........... 280/775 |
| 5,326,250 A | 7/1994 | Doudement | |
| 5,762,981 A * | 6/1998 | Nitsche | ........... 425/522 |
| 6,053,723 A | 4/2000 | Guiffant et al. | |
| 6,113,377 A * | 9/2000 | Clark | ........... 425/195 |
| 6,224,817 B1 | 5/2001 | Villers | |
| 6,428,302 B1 * | 8/2002 | Tsau | ........... 425/522 |
| 6,444,159 B2 | 9/2002 | Petre | |
| 6,447,281 B1 | 9/2002 | Petre | |
| 6,648,623 B2 | 11/2003 | Petre | |
| 2001/0051192 A1 * | 12/2001 | Petre | ........... 425/526 |

* cited by examiner

*Primary Examiner*—Robert B. Davis
(74) *Attorney, Agent, or Firm*—Hovey Williams LLP (57) ABSTRACT

Clam shell-type blow mold apparatus has a pair of opposed upper mold halves that cooperate to define a partial blow cavity. A one-piece bottom mold portion that completes the blow cavity is locked up against the top mold portion by a locking assembly to prevent separation of the bottom mold portion from the top mold portion during the high pressure blow cycle. The locking assembly includes a support ring for the bottom mold portion that has a number of radially outwardly projecting male lugs adapted to fit into female receiving notches on opposed halves of a lock ring on the upper mold portion. Individual ledges at the bottoms of the notches underlie the lugs of the support ring when the mold halves are fully closed so as to preclude separation of the support ring, and thus the bottom mold portion, from the lock ring and the upper mold portion. The notches in the support ring are interposed between pairs of bolt holes in the lock ring.

39 Claims, 9 Drawing Sheets

LOCK APPARATUS FOR THE BASE PORTION OF A BLOW MOLD

TECHNICAL FIELD

This invention relates to equipment used in the blow molding of thermoplastic articles, such as bottles. More particularly, it relates to improvements in clam shell-type blow mold apparatus that utilizes a pair of opposed mold halves and a cooperating bottom mold portion to define the blow cavity for the article. The invention especially pertains to an improved way of locking the bottom mold portion against separation from the upper portion of the mold during the blow cycle.

BACKGROUND AND SUMMARY

Blow molding machines that use clam shell-type mold apparatus to form the upper portion of a blow mold cavity and a cooperating bottom mold portion to complete the cavity are well known in the art. See, for example, U.S. Pat. No. 5,968,560 relating to a blow molding device for producing thermoplastic containers; U.S. Pat. No. 6,447,281 relating to a blow mold shell and shell holder assembly for a blow-molding machine; and U.S. Pat. No. 5,326,250 relating to opening and closing mechanism for a portfolio blow and blow-stretch mold.

Machines of this type operate at high speeds to maximize production throughput. As the opposing clam shell halves of the mold apparatus swing closed at the blow station during each blow cycle, push-up mechanism at the station below the clam shell halves must elevate a bottom portion of the mold up into proper position between the clam shell halves just before they close. Once closed, the clam shell halves grip and retain the bottom blow mold portion against separation from the rest of the mold during the high pressure blow cycle. Lock ring halves carried on the upper mold halves match up with complemental structure on a ring carried on the push up mechanism to retain the push up mechanism and thus the bottom mold portion in place when the upper mold halves fully close.

Obviously, the timing between the upper mold halves and the push-up mechanism is critical. If the timing is imperfect for any reason, the mold halves may close too soon and the mold surfaces of the bottom mold portion may be damaged by the lock ring segments as they prematurely enter the path of travel of the upwardly moving bottom mold portion.

The present invention provides a lock up arrangement in which the lock ring segments on the upper mold halves are configured to avoid encroachment into the path of travel of the lower mold portion even when the timing is imperfect between the upper mold halves and the push-up mechanism. A bottom mold portion that might be damaged by out-of-time lock ring segments of conventional design will be spared damage by the inventive segments due to the fact that they are configured to always remain out of the path of travel of the bottom mold portion even if the upper mold halves close prematurely.

To this end, the present invention contemplates lock ring segments that are bolted to the bottom edge of upper mold halves as in the past. However, instead of the prior art approach wherein an inwardly projecting annular ledge on the segments protrudes into the path of travel of the bottom mold portion, the new lock ring segments are each provided with one or more outwardly recessed notches that present ledges located outside the profile of the bottom mold portion when the mold halves are closed. In turn, one or more outwardly projecting lugs on the ring that supports the bottom mold portion are configured to slip into the notches of the lock ring segments and onto the support ledges thereof when the mold halves close about the bottom mold portion and push-up mechanism. The lugs of the support ring are thus prevented by the ledges from moving away from the upper mold portion. The notches and their ledges are located between respective pairs of bolt locations on the lock ring segments.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Prior Art Construction

Figure 1:
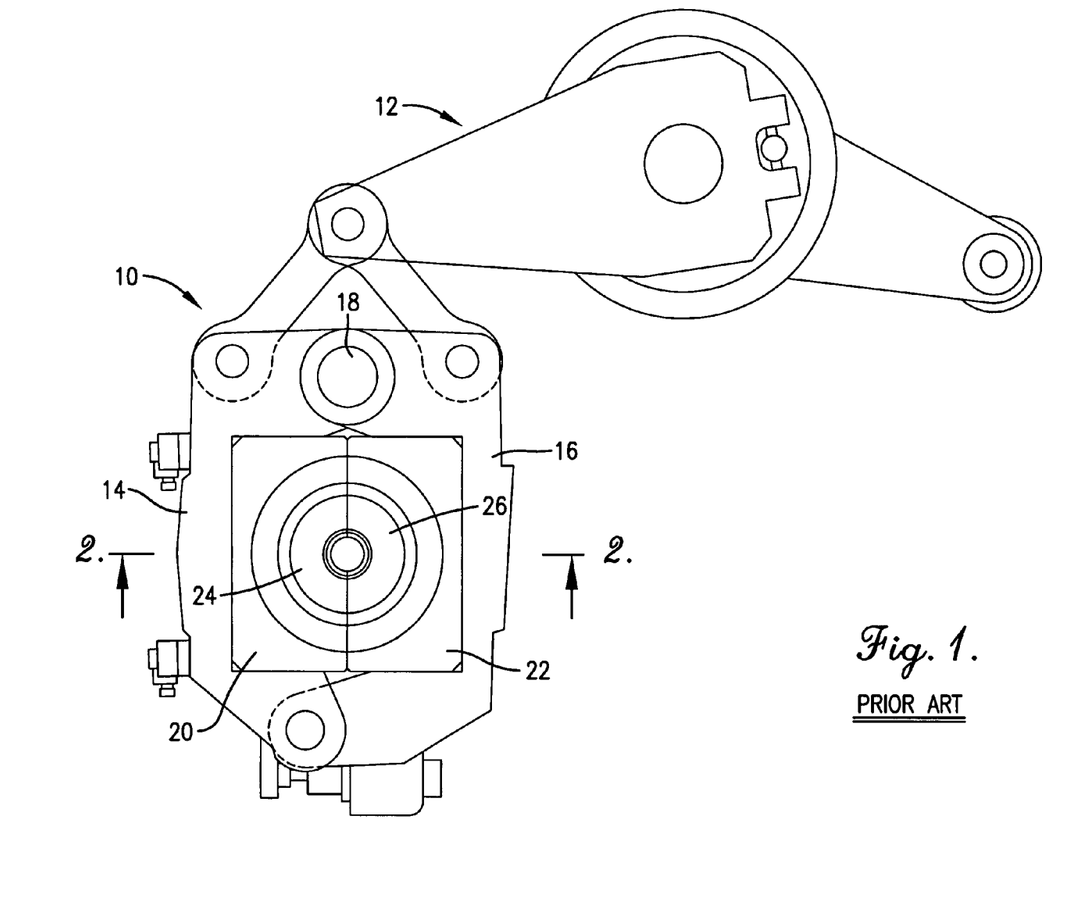
FIG. 1 is a top plan view of a prior art clam shell-type mold apparatus in combination with opening and closing mechanism for that apparatus, the clam shell halves of the mold apparatus being illustrated in a closed position.
Figure 1A:
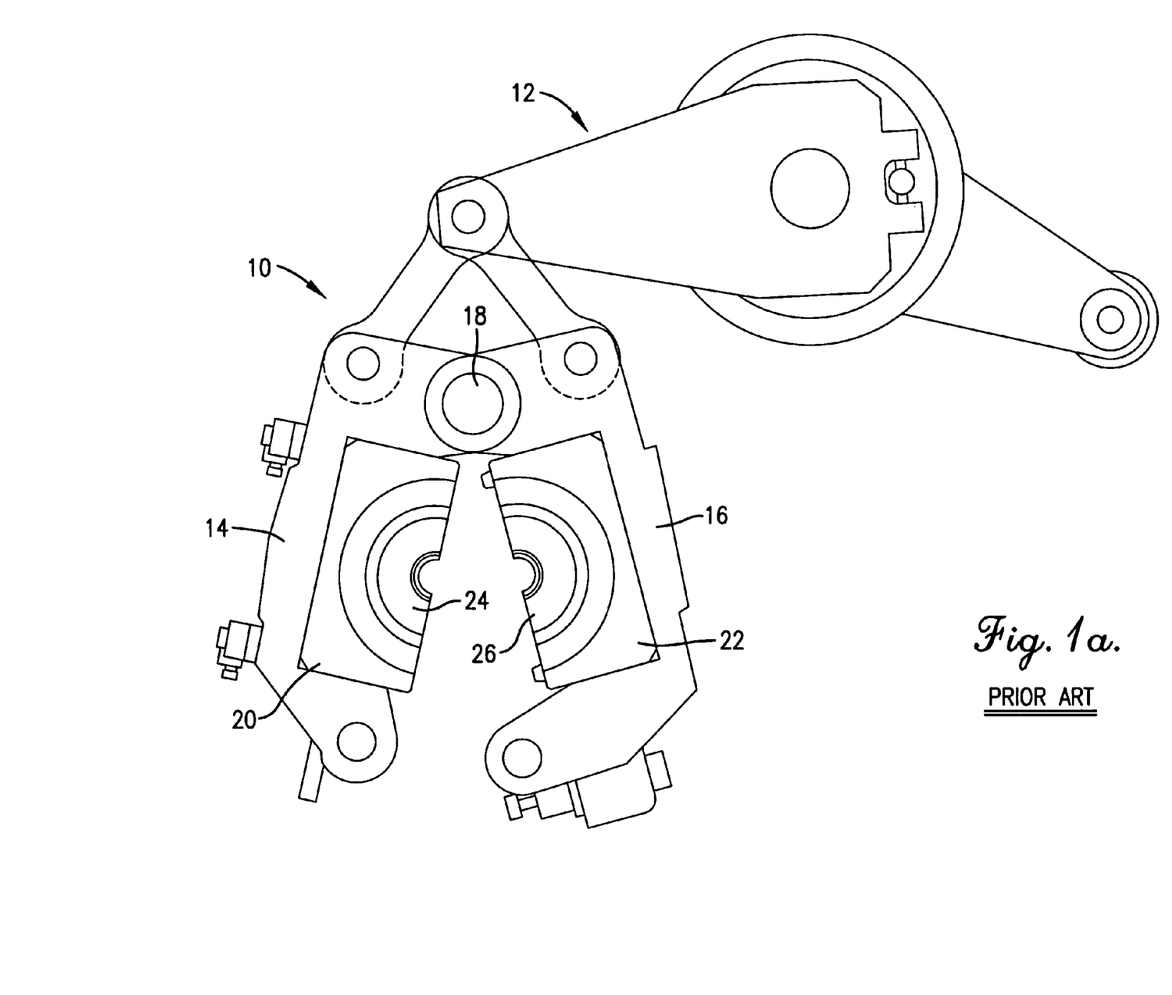
FIG. 1a shows the prior art apparatus and mechanism of FIG. 1 in an opened position.

The prior art mold apparatus 10 in FIGS. 1 and 1a is opened and closed by opening and closing mechanism 12 which may take the form of that disclosed in U.S. Pat. Nos. 5,326,250 and 6,447,281. Accordingly, the disclosures of the '250 and '281 patents are hereby incorporated by reference in their entirety into the present specification. Mold apparatus 10 includes a pair of carrier halves 14 and 16 that are pivotally interconnected by a pivot 18 for movement by mechanism 12 between a closed position in FIG. 1 and an open position in FIG. 1a. Carrier halves 14, 16 respectively support holder halves 20 and 22 which, in turn, support mold halves 24 and 26. This construction is similar to that disclosed in U.S. Pat. No. 5,968,560, which patent is hereby incorporated by reference into the present specification.

Figure 2:
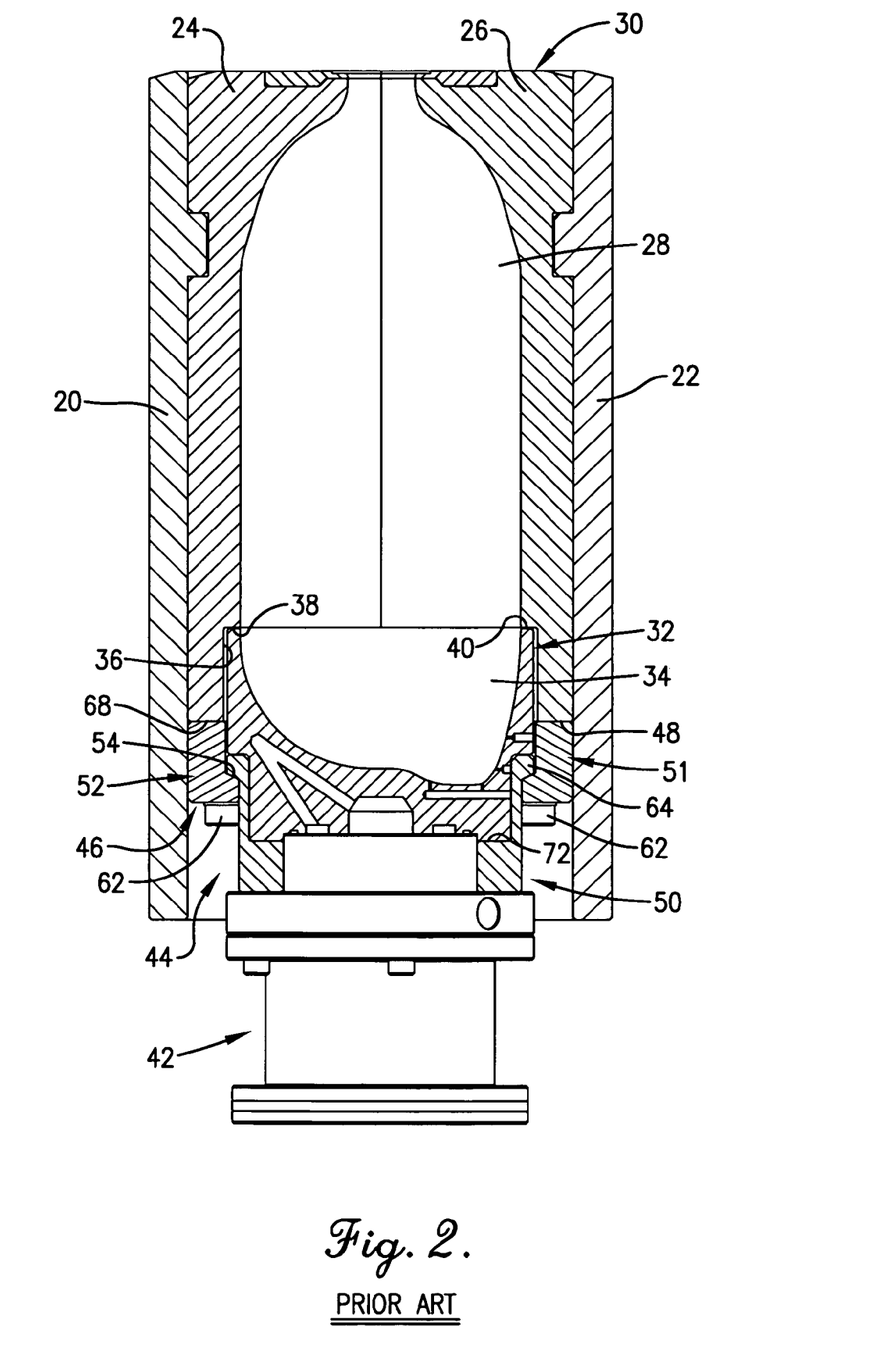
FIG. 2 is a vertical cross sectional view of the prior art mold apparatus of FIG. 1 taken substantially along line 2-2 of FIG. 1, the lower mold portion being illustrated in its raised position cooperating with the upper mold halves to define a complete blow cavity.
Figure 2A:
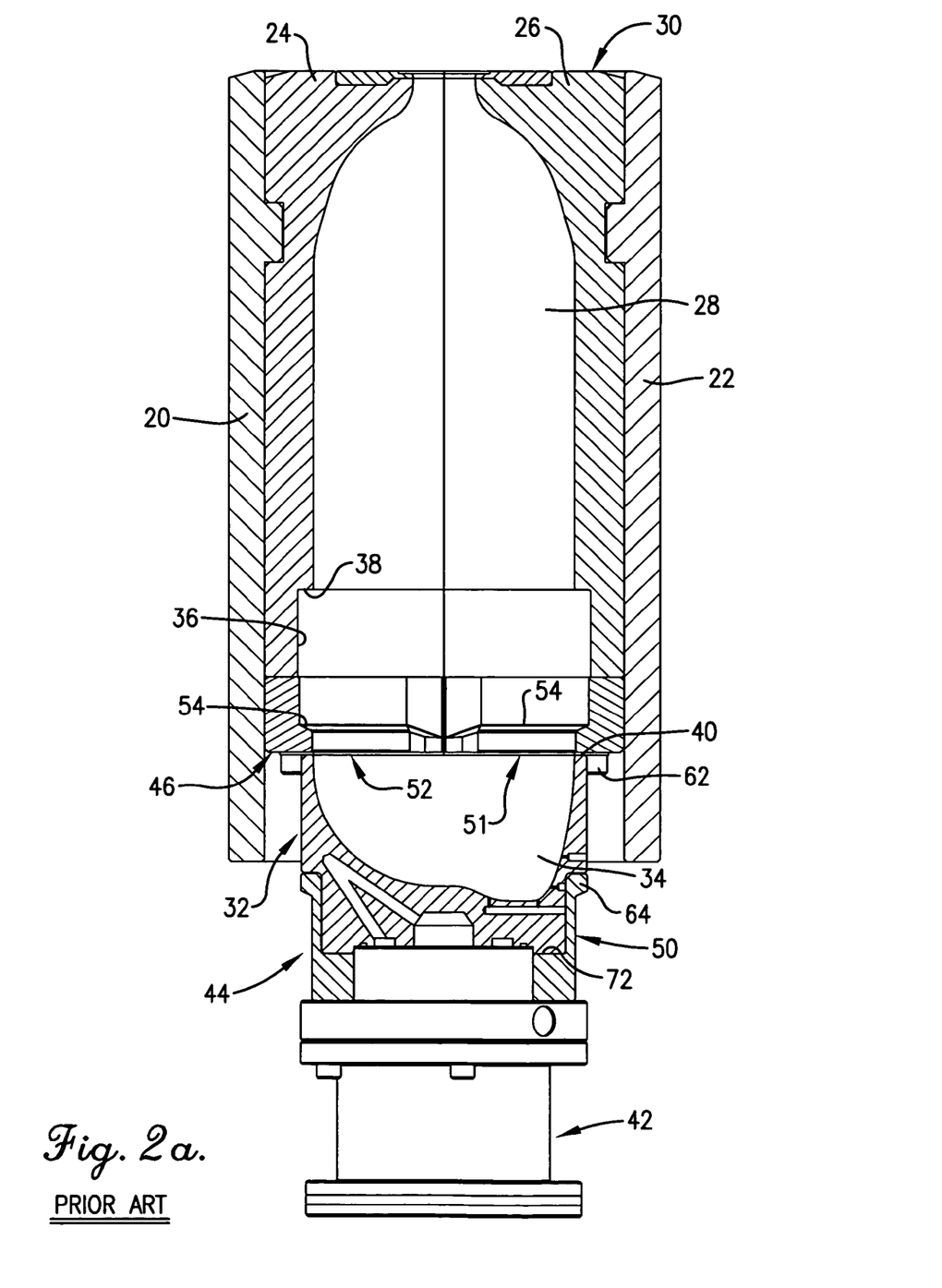
FIG. 2a is a view of the prior art apparatus similar to FIG. 2 but showing the lower mold portion in a withdrawn or lowered position.

As illustrated in FIGS. 2 and 2a, mold halves 24, 26 cooperate to partially define an internal mold cavity 28 when the mold halves 24, 26 are closed. Mold halves 24, 26 thus jointly present an upper mold portion which may be identified by the numeral 30. A lower mold portion 32 is generally cup-shaped to present an upwardly facing cavity 34 that cooperates with cavity 28 to define a complete blow cavity for a bottle or other article to be blown when lower mold portion 32 is in its raised position as illustrated in FIG. 2.

Upper mold portion 30 is open at its bottom end so as to fully receive lower mold portion 32 when lower mold portion 32 is fully raised. Lower mold portion 32 fits up into a recess 36 in the bottom end of upper mold portion 30, such recess 36 having a downwardly facing, annular shoulder 38 that is abuttingly engaged by the top edge 40 of bottom mold portion 32 when portion 32 is fully raised. Bottom mold portion 32 is raised and lowered between the positions of FIG. 2 and FIG. 2a by push-up mechanism broadly denoted by the numeral 42, as well understood by those skilled in the art.

Bottom portion 32 is maintained in its raised position not only by push-up mechanism 42, but also by a locking assembly 44 that becomes effective for such purpose when mold apparatus 10 is fully closed. Locking assembly 44 includes as its primary components an upper lock ring 46 that is attached to the bottom edge 48 of upper mold portion 30 and a support ring 50 that rests upon push-up mechanism 42. Lock ring 46, as shown in detail in FIG. 3, comprises a pair of semi-circular halves 51 and 52 that are designed to be disposed in horizontally opposed relationship to one another when mold assembly 10 is closed so as to effectively form a complete ring. The two halves 51, 52 are identical to one another, each including a radially inwardly projecting ledge 54 having an upwardly facing surface 56. Each half 51, 52 further includes a radially outwardly disposed, upright wall portion 58 having four upright bolt holes 60 passing therethrough. Bolt holes 60 receive corresponding bolts 62 (FIGS. 2 and 2a) that threadably secure halves 51, 52 to bottom edge 48 of upper mold portion 30.

Figure 3:
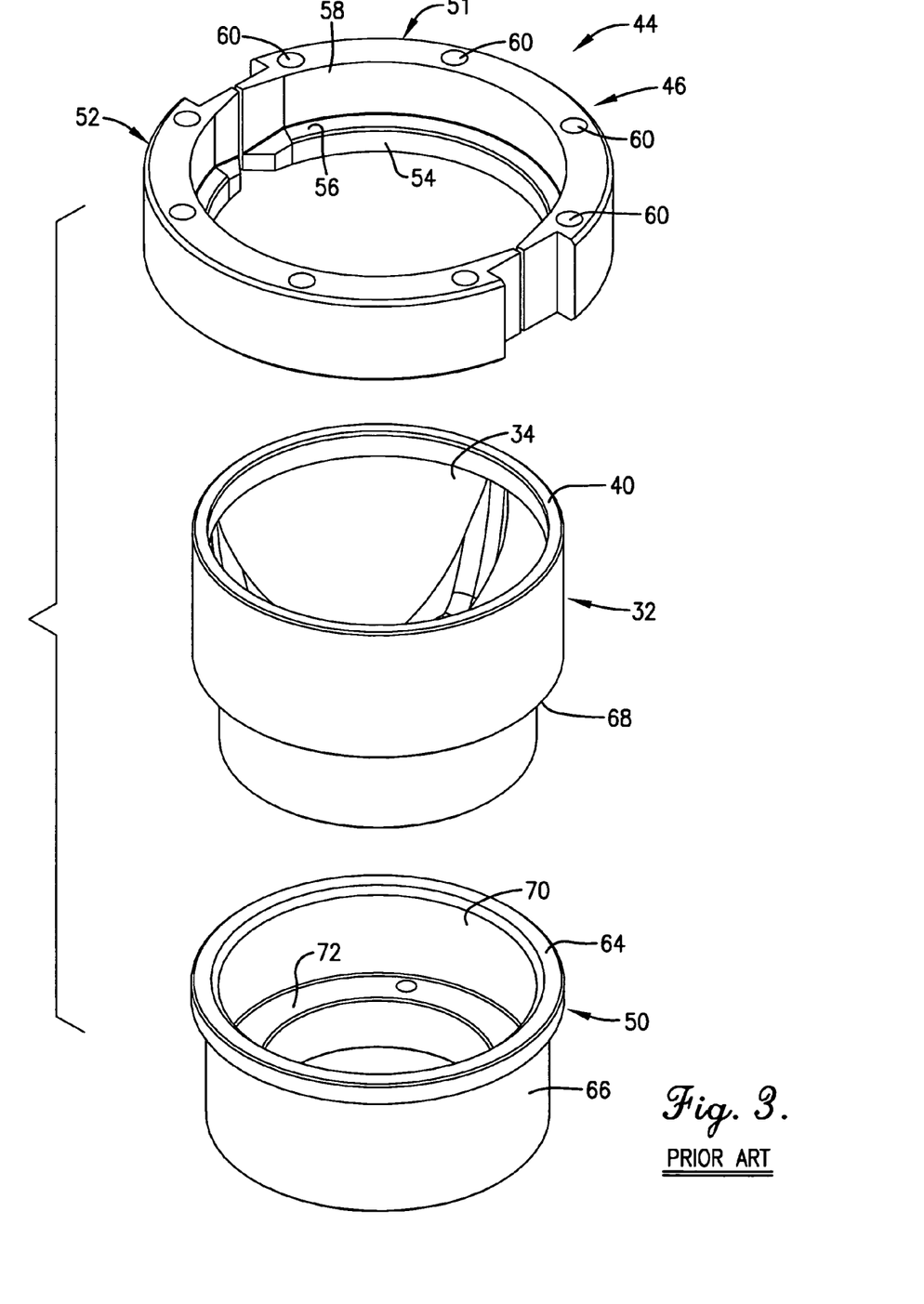
FIG. 3 is an enlarged, exploded, isometric view of the prior art lock ring and support ring in combination with a bottom mold portion.

On the other hand, support ring 50 is a one-piece component of generally cylindrical and annular overall configuration. Among other things, support ring 50 has a continuous annular lip 64 about its upper extremity that overhangs and projects outwardly beyond a smaller diameter main body portion 66. The outer diameter of lip 64 is slightly less than the inner diameter of wall portion 58 of lock ring 46 when mold apparatus 10 is closed such that lip 64 can be fully surrounded by wall portion 58 and rest upon ledges 54 of lock ring halves 51, 52. Thus, support ring 50 is precluded from downward movement out of lock ring 46.

Bottom mold portion 32 has an undercut lower portion that presents a downwardly facing, annular shoulder 68 supported by the upwardly facing top surface of lip 64. In addition, support ring 50 has a stepped bore 70 therethrough presenting a larger diameter upper portion and a smaller diameter lower portion that cooperatively define an upwardly facing, annular seat 72 underlying the bottom portion 32 to provide additional support.

New Locking Assembly

Figure 4:
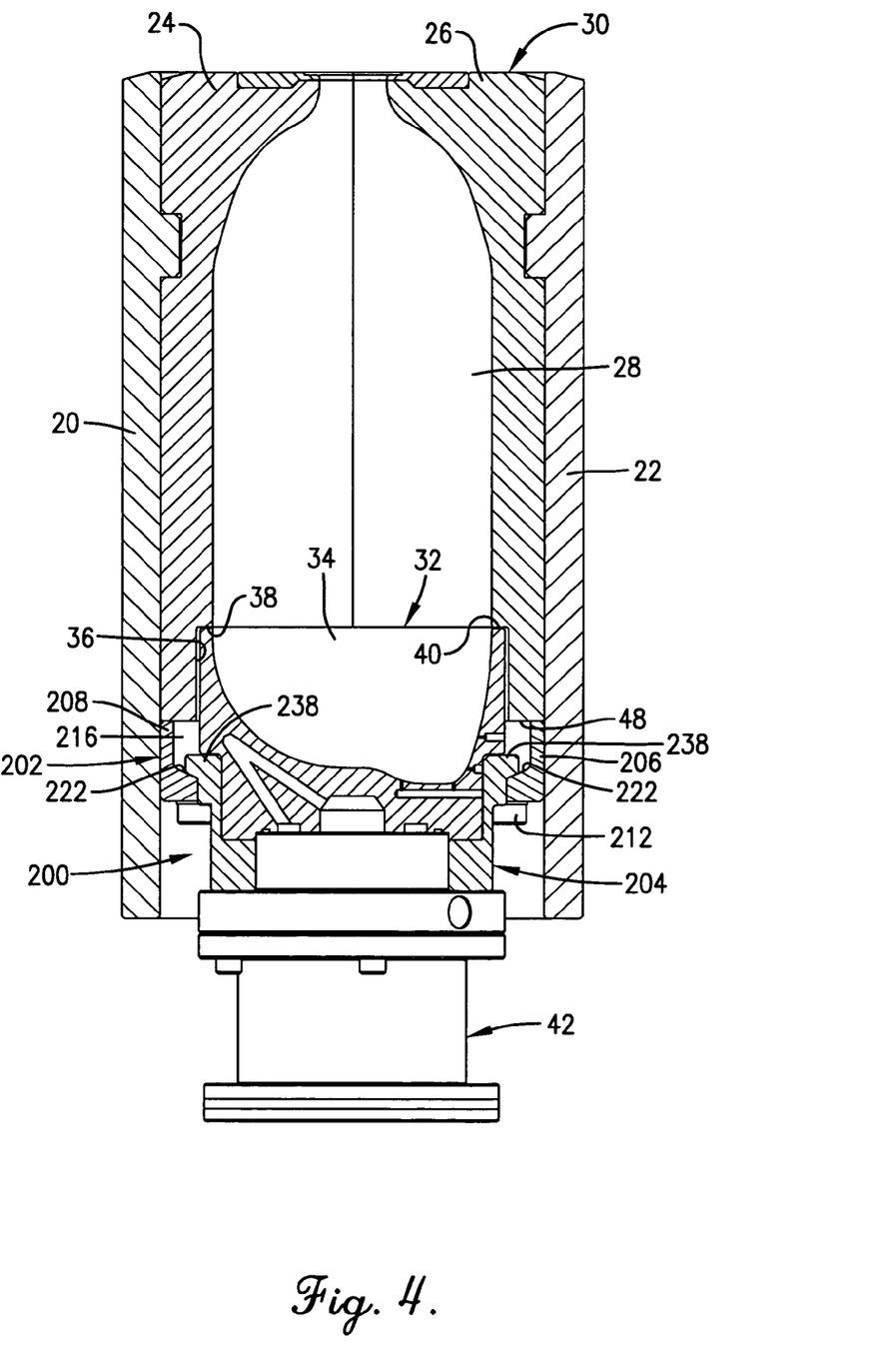
FIG. 4 is a vertical cross section view of mold apparatus incorporating a lock up arrangement in accordance with the principles of the present invention and showing the lower mold portion elevated into its fully raised position for cooperating with the upper mold halves in forming the internal blow cavity.
Figure 4A:
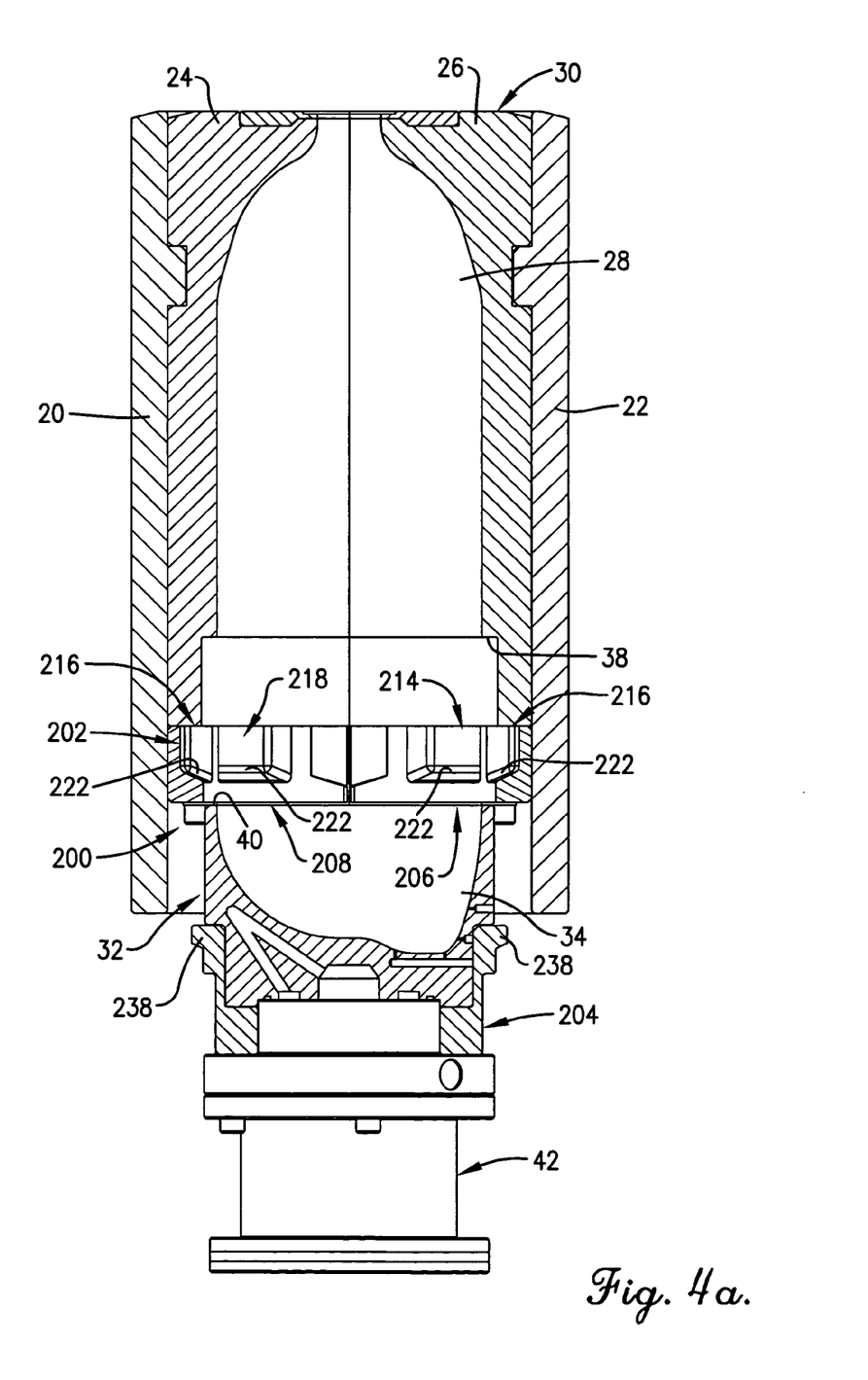
FIG. 4a is a vertical cross sectional view of the mold apparatus of FIG. 4 but showing the lower mold portion withdrawn down out of the upper mold portion.
Figure 5:
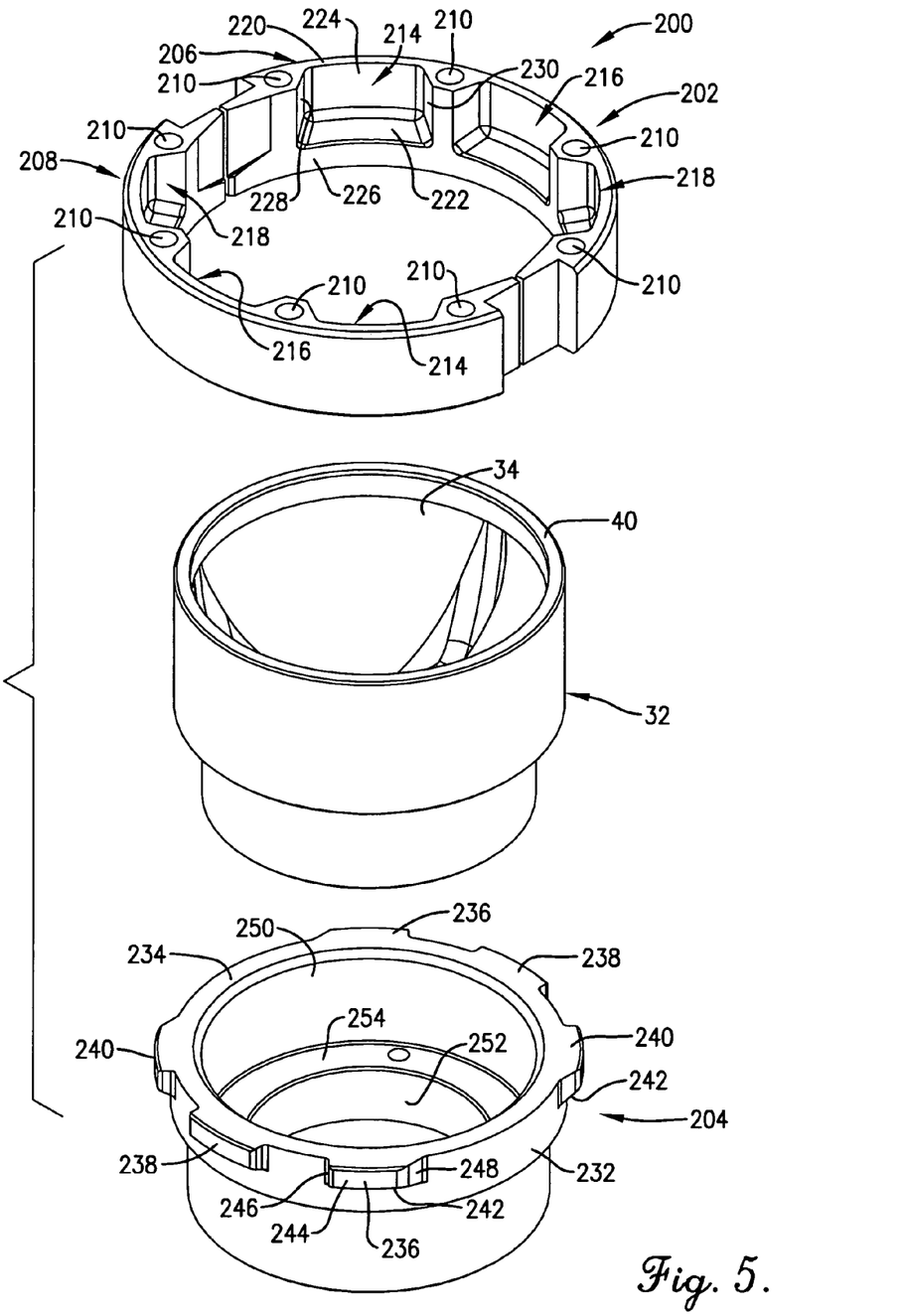
FIG. 5 is an enlarged, exploded isometric view of the lock ring and support ring of the present invention in conjunction with a bottom mold portion of a blow mold.
Figure 6:
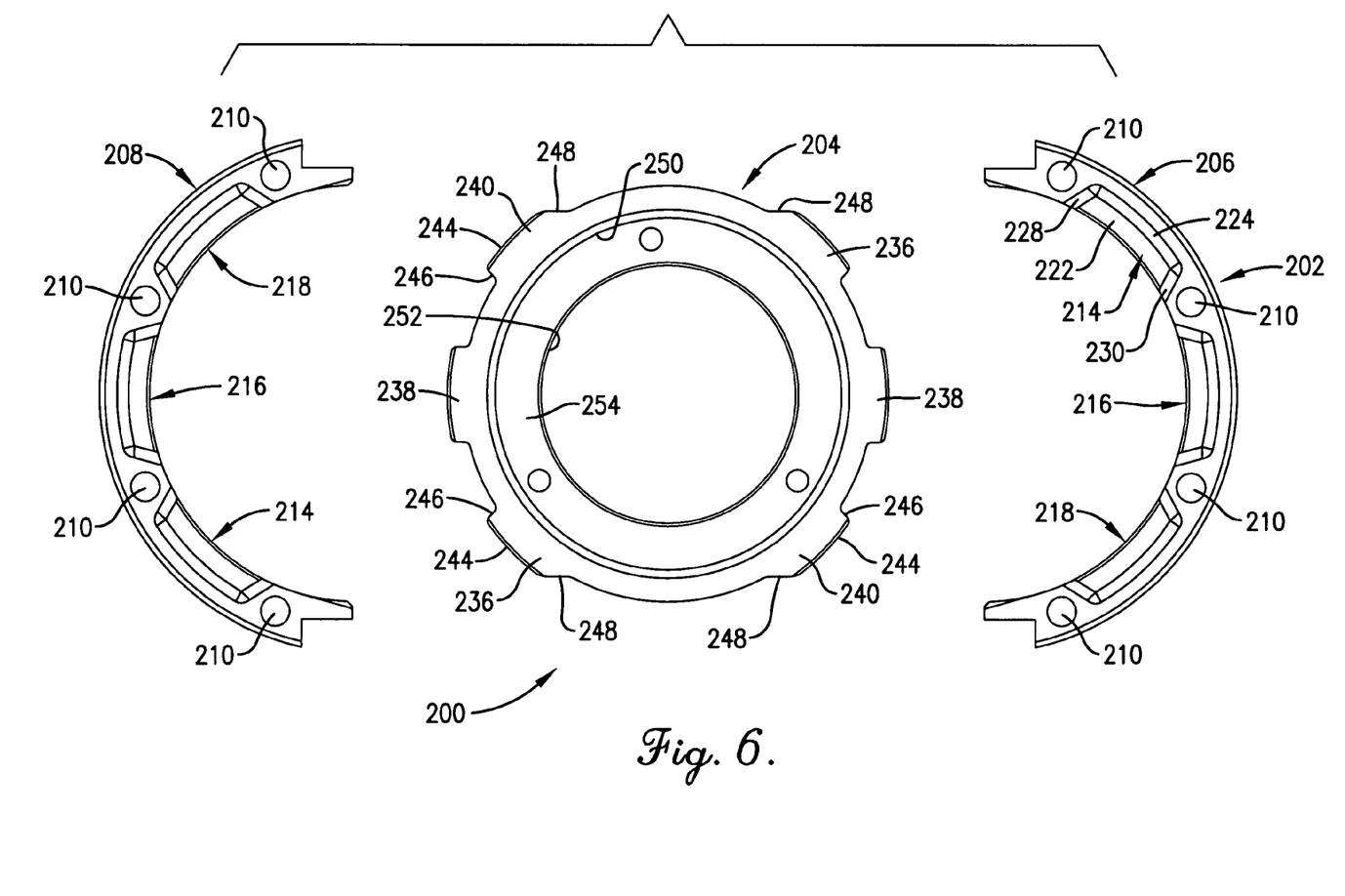
FIG. 6 is an exploded top plan view of the lock ring and support ring of the present invention illustrating details of construction.

FIGS. 4, 4a, 5 and 6 disclose a new locking assembly 200 constructed in accordance with the principles of the present invention. With exception of the locking assembly 200, the mold apparatus of FIGS. 4-6 is the same as that illustrated in FIGS. 1-3.

Like locking assembly 44, locking assembly 200 includes as its primary components a lock ring 202 that fastens to the bottom edge 48 of upper mold portion 30, and a support ring 204 that rests upon the pedestal of push-up mechanism 42. Lock ring 200 and support ring 204 are configured differently than lock ring 46 and support ring 50, however.

To this end, lock ring 202 includes a pair of normally horizontally opposed, semi-circular lock ring halves 206 and 208 that are each provided with a plurality of, preferably four, upright bolt holes 210 for receiving corresponding bolts 212 as illustrated in FIGS. 4 and 4a. Bolts 212 pass through halves 206 and 208 and are threadably received by corresponding mold halves 24 and 26. Each lock ring half 206, 208 has three circumferentially spaced notches 214, 216 and 218 therein which are interspersed between respective pairs of the four bolt holes 210 as illustrated particularly in FIGS. 5 and 6. Although it is within the concepts of the present invention to have a single notch in each lock ring half 206, 208, three of such notches are preferred. In a preferred form of the invention, each notch 214, 216 and 218 has an open top formed in a top surface 220 of the lock ring half, although the notch could also be formed with a closed top. Each notch 214, 216, and 218 also has a closed bottom that presents an outwardly extending ledge 222. Each notch further has an upright back wall 224 that is recessed from an interior surface 226 of the lock ring half, as well as a pair of circumferentially spaced sidewalls 228 and 230 that extend upwardly from opposite lateral extremities of ledge 222. Back wall 224 interconnects sidewalls 228 and 230.

Support ring 204 comprises a generally cylindrical and annular body provided with an upright exterior surface 232 and a horizontal top end surface 234. Two diametrically opposed sets of lugs 236, 238 and 240 project radially outwardly from opposite sides of the body adjacent upper end surface 234. In the preferred embodiment lugs 236, 238 and 240 are flush with top end surface 234 but overhang and project radially outwardly beyond upright exterior surface 232. Alternatively, the lugs could project above or below top surface 234. Although each set of diametrically opposed lugs may comprise only a single such lug, in a preferred embodiment, three of such lugs are provided. The number of lugs corresponds to the number of notches provided in lock ring 202.

Each lug 236, 238 and 240 is provided with an outermost peripheral edge 244 and a pair of opposite side edges 246 and 248 that extend outwardly from upright surface 232 and connect with outer peripheral edge 244. In a preferred embodiment, the side edges 246, 248 of each intermediate lug 238 project generally radially outwardly while converging slightly as outer edge 244 is approached. On the other hand, with respect to the outer lugs 236 and 240 of each set, the outer edge 248 thereof has a relief bevel incorporated therein so that such edges slope more dramatically than the inner edges 246 thereof. As will be seen, such relief bevel facilitates closure of the mold halves and lock ring halves around support ring 204 during operation.

Support ring 204 is provided with a stepped central bore therethrough presenting an upper enlarged diameter bore portion 250 and a lower reduced diameter bore portion 252. Such two portions 250, 252 thus cooperate to define an upwardly facing, annular seat 254 within the interior of support ring 204 that serves as one portion of a support surface for bottom mold portion 32. Another portion of such support surface is presented by the top end surface 234 of support ring 204.

Operation

The manner of use of locking assembly 200 should be apparent from the foregoing detailed description. Therefore, the operation of the apparatus will only be briefly described. Further, although the present invention has been shown and described in connection with a base cup style bottom mold portion 32, it has equal utility in connection with a bottom mold portion that comprises a standard push up for a champagne base.

FIG. 2*a* illustrates the fact that in the prior art, ledges 54 of lock ring halves 51, 52 may project into the profile of the bottom mold portion 32, depending upon the diameter of the particular bottom mold portion involved. In the illustrated example of the prior art, ledges 54 directly overlie the upper edge 40 of bottom mold portion 32 when bottom mold portion 32 is fully withdrawn and upper mold potion 30 is completely closed. Although, ideally, in the prior art the upper mold portion 30 is never closed until bottom mold portion 32 has been fully received within recess 36 as illustrated in FIG. 2, in practice there may be times when upper mold portion 30 closes prematurely so as to encroach upon the path of travel of bottom mold portion 32 before bottom mold portion 32 has been fully raised. This can cause serious damage to bottom mold portion 32 and other parts of the machine, as well as significant and costly down time.

On the other hand, as illustrated in FIG. 4*a* in the present invention, using the same size bottom mold portion 32, no portion of upper lock ring 202 overlies the upper edge 40 of bottom mold portion 32. Instead, the supporting ledges 222 of lock ring halves 206, 208 are disposed radially outside of the profile of bottom mold portion 32. Consequently, even if top mold portion 30 should happen to close too soon, bottom mold portion 32 will not be engaged and damaged by lock ring 202. Although lock ring halves 206, 208 might improperly engage and damage support ring 204, that part is easily replaced and contains no delicate mold surfaces. Likewise, lock ring 202 is a relatively inexpensive component that is easily replaced in the event of damage thereto.

As shown in FIG. 4, when bottom mold portion 204 is fully raised and top mold portion 30 has closed, the male portions of support ring 204, i.e. lugs 236, 238 and 240, project into the female portions on lock ring 202, i.e. notches 214, 216 and 218. Lugs 236, 238 and 240 thus come into overlying relationship with ledges 222 of notches 214, 216 and 218 such that ledges 222 preclude separation of support ring 204, and thus bottom mold portion 32, from top mold portion 30. It will be appreciated that the relieved or beveled portions of side edges 248 on outer lugs 236 and 240 facilitate entry of outer lugs 236 and 240 into their respective notches 214 and 218 as upper mold halves 24 and 26 swing about pivot 18 from their open condition of FIG. 1*a* to their closed condition of FIG. 1.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. Blow mold apparatus comprising:
an upper mold portion having an open bottom defined by a bottom annular edge of the upper mold portion,
said upper mold portion comprising a pair of opposed mold halves cooperating and configured to partially define an internal blow cavity therebetween;
a bottom mold portion received within said open bottom of the upper mold portion and cooperating with said mold halves to complete the blow cavity;
a lock ring secured to said bottom edge of the upper mold portion and surrounding said bottom mold portion,
said lock ring comprising a pair of opposed lock ring halves secured to respective ones of said mold halves,
each of said lock ring halves having a plurality of circumferentially spaced bolt holes therein;
a plurality of bolts received within said holes and releasably securing the lock ring halves to their respective mold halves,
each of said lock ring halves being provided with at least one upwardly facing support ledge positioned between a pair of said bolt holes; and
a support ring supporting said bottom mold portion against separation from the upper mold portion,
said support ring including at least a pair of radially outwardly projecting lugs disposed between respective pairs of bolt holes in the lock ring halves and received upon corresponding ledges of the lock ring halves.

2. Blow mold apparatus as claimed in claim 1,
each ledge forming the bottom of a notch in the lock ring half,
said notch having an open side formed in an interior surface of the lock ring half,
said notch further having a pair of opposite sidewalls projecting upwardly from opposite extremities of the ledge,
said notch further having a back wall that is recessed with respect to said interior surface and interconnects said sidewalls.

3. Blow mold apparatus as claimed in claim 2,
said notch further having an open top formed in a top surface of the lock ring half.

4. Blow mold apparatus as claimed in claim 2,
there being three notches and three corresponding ledges on each lock ring half.

5. Blow mold apparatus as claimed in claim 1,
said support ring having two sets of diametrically opposed lugs,
each set of lugs included a pair of opposite end lugs and an intermediate lug.

6. Blow mold apparatus as claimed in claim 5,
each opposite end lug having an outer peripheral edge and a pair of opposite side edges joined with said outer edge.

7. Blow mold apparatus as claimed in claim 6,
the side edges that are the most circumferentially spaced from one another in each set of lugs having relief bevels that facilitate placement of the lugs onto corresponding ledges of the lock ring halves.

8. Blow mold apparatus as claimed in claim 7,
each ledge forming the bottom of a notch in the lock ring half,
said notch having an open side formed in an interior surface of the lock ring half,
said notch further having a pair of opposite sidewalls projecting upwardly from opposite extremities of the ledge, said notch further having a back wall that is recessed with respect to said interior surface and interconnects said sidewalls.

9. Blow mold apparatus as claimed in claim 8,
said notch further having an open top formed in a top surface of the lock ring half.

10. Blow mold apparatus as claimed in claim 8,
there being three notches and three corresponding ledges on each lock ring half.

11. Blow mold apparatus as claimed in claim 1,
said support ring having an upper end surface and an upright exterior surface intersecting said upper end surface,
said lugs projecting outwardly beyond said upright exterior surface.

12. Blow mold apparatus as claimed in claim 11,
each of said lugs having a top surface that is flush with said upper end surface of the support ring.

13. Blow mold apparatus as claimed in claim 12,
each of said lugs having a bottom surface that is spaced below said top surface and projects outwardly from said upright exterior surface.

14. Blow mold apparatus as claimed in claim 13,
said upper end surface comprising at least a portion of said support surface.

15. Blow mold apparatus as claimed in claim 14,
said support ring having an upright, stepped internal bore therethrough presenting an upwardly facing annular seat that is recessed below said top surface,
said annular seat comprising another portion of said support surface.

16. A locking assembly for use in holding the bottom mold portion of a blow mold against separation from the top mold portion of the mold during formation of a hollow article within the mold, said assembly comprising:
a lock ring comprising a pair of opposed lock ring halves each having a plurality of circumferentially spaced bolt holes therein for use in attaching the lock ring to the top mold portion,
each of said lock ring halves being provided with at least one upwardly facing support ledge positioned between a pair of said bolt holes; and
a support ring for the bottom mold portion,
said support ring including a support surface disposed for underlying the bottom mold portion and at least a pair of radially outwardly projecting lugs adapted to project between respective pairs of bolt holes and to overlie corresponding ledges of the lock ring halves.

17. A locking assembly as claimed in claim 16,
each ledge forming the bottom of a notch in the lock ring half,
said notch having an open side formed in an interior surface of the lock ring half,
said notch further having a pair of opposite sidewalls projecting upwardly from opposite extremities of the ledge,
said notch further having a back wall that is recessed with respect to said interior surface and interconnects said sidewalls.

18. A locking assembly as claimed in claim 17,
said notch having an open top formed in a top surface of the lock ring half.

19. A locking assembly as claimed in claim 17,
there being three notches and three corresponding ledges on each lock ring half.

20. A locking assembly as claimed in claim 16,
said support ring having two sets of diametrically opposed lugs,
each set of lugs included a pair of opposite end lugs and an intermediate lug.

21. A locking assembly as claimed in claim 20,
each opposite end lug having an outer peripheral edge and a pair of opposite side edges joined with said outer edge.

22. A locking assembly as claimed in claim 21,
the side edges that are the most circumferentially spaced from one another in each set of lugs having relief bevels that facilitate placement of the lugs onto corresponding ledges of the lock ring halves.

23. A locking assembly as claimed in claim 22,
each ledge forming the bottom of a notch in the lock ring half,
said notch having an open side formed in an interior surface of the lock ring half,
said notch further having a pair of opposite sidewalls projecting upwardly from opposite extremities of the ledge,
said notch further having a back wall that is recessed with respect to said interior surface and interconnects said sidewalls.

24. A locking assembly as claimed in claim 23,
said notch further having an open top formed in a top surface of the lock ring half.

25. A locking assembly as claimed in claim 23,
there being three notches and three corresponding ledges on each lock ring half.

26. A locking assembly as claimed in claim 16,
said support ring having an upper end surface and an upright exterior surface intersecting said upper end surface,
said lugs projecting outwardly beyond said upright exterior surface.

27. A locking assembly as claimed in claim 26,
each of said lugs having a top surface that is flush with said upper end surface of the support ring.

28. A locking assembly as claimed in claim 27,
each of said lugs having a bottom surface that is spaced below said top surface and projects outwardly from said upright exterior surface.

29. A locking assembly as claimed in claim 28,
said upper end surface comprising at least a portion of said support surface.

30. A locking assembly as claimed in claim 29,
said support ring having an upright, stepped internal bore therethrough presenting an upwardly facing annular seat that is recessed below said top surface,
said annular seat comprising another portion of said support surface.

31. A lock ring for use in holding the bottom mold portion of a blow mold against separation from the top mold portion of the mold during formation of a hollow article within the mold, said lock ring comprising:
a pair of opposite lock ring halves each having a plurality of circumferentially spaced bolt holes therein for use in attaching the lock ring to the top mold portion,
each of said lock ring halves being provided with at least one upwardly facing support ledge positioned between a pair of said bolt holes.

32. A lock ring as claimed in claim 31,
each ledge forming the bottom of a notch in the lock ring half, said notch having an open side formed in an interior surface of the lock ring half,
said notch further having a pair of opposite sidewalls projecting upwardly from opposite extremities of the ledge,
said notch further having a back wall that is recessed with respect to said interior surface and interconnects said sidewalls.

33. A lock ring as claimed in claim 32,
said notch further having an open top formed in a top surface of the lock ring half.

34. A lock ring as claimed in claim 32,
there being three notches and three corresponding ledges on each lock ring half.

35. A lock ring as claimed in claim 31,
there being three notches and three corresponding ledges on each lock ring half.

36. A support ring for use with a lock ring in holding the bottom mold portion of a blow mold against separation from the top mold portion of the mold during formation of a hollow article within the mold, said support ring comprising:
an annular body for supporting the bottom mold portion having an upper end surface and an upright exterior surface intersecting at least a portion of said upper end surface,
said body further having a lower end surface that is spaced axially below said upper end surface
said body further having at least a pair of radially outwardly projecting lugs,
each of said lugs having a bottom surface that is spaced axially above said lower end surface,
at least a portion of said upright exterior surface being spaced axially below each of said lugs, such that each of said lugs overhangs at least a portion of said upright exterior surface.

37. A support ring as claimed in claim 36,
said support ring having two sets of diametrically opposed lugs,
each set of lugs included a pair of opposite end lugs and an intermediate lug.

38. A support ring as claimed in claim 37,
each opposite end lug having an outer peripheral edge and a pair of opposite side edges joined with said outer edge.

39. A support ring as claimed in claim 38,
the side edges that are the most circumferentially spaced from one another in each set of lugs having relief bevels.

* * * * *